US008409873B2

(12) United States Patent
Woodside et al.

(10) Patent No.: US 8,409,873 B2
(45) Date of Patent: Apr. 2, 2013

(54) METHOD OF PIPETTING USING A PIPETTE TIP HOLDER

(75) Inventors: Steven Woodside, Vancouver (CA); Terry Thomas, Vancouver (CA); Graeme Cross, Brunswick (AU); Andrew Angus, Pearcedale (AU)

(73) Assignee: Stemcell Technologies Inc., Vancouver, British Columbia (CA)

( * ) Notice: Subject to any disclaimer, the term of this patent is extended or adjusted under 35 U.S.C. 154(b) by 647 days.

(21) Appl. No.: 12/576,936

(22) Filed: Oct. 9, 2009

(65) Prior Publication Data

US 2010/0024575 A1 Feb. 4, 2010

Related U.S. Application Data

(62) Division of application No. 11/184,978, filed on Jul. 20, 2005, now abandoned.

(51) Int. Cl.
*G01N 1/10* (2006.01)
*B01L 3/02* (2006.01)

(52) U.S. Cl. ............ 436/180; 436/49; 436/54; 422/511; 422/524; 422/525; 422/526; 422/931; 422/919; 422/929; 422/933

(58) Field of Classification Search .......... 422/500–501, 422/509, 511, 521, 524–525, 919, 929, 931, 422/933, 526; 436/180, 49, 54
See application file for complete search history.

(56) References Cited

U.S. PATENT DOCUMENTS 4,389,374 A * 6/1983 Sutton et al. .................. 422/562
4,411,868 A * 10/1983 Noack ........................... 422/562
4,676,377 A 6/1987 Rainin et al.
4,936,152 A 6/1990 Aldred
5,008,084 A * 4/1991 Kelley .......................... 422/547
D323,400 S 1/1992 Frenkel et al.
5,232,669 A 8/1993 Pardinas
5,366,088 A 11/1994 Hill et al.
5,487,997 A 1/1996 Stolp
5,612,000 A 3/1997 Lemieux
5,630,988 A 5/1997 Stolp
5,779,984 A * 7/1998 Kelly et al. .................. 422/564
5,882,603 A * 3/1999 Taggart ......................... 422/564
6,007,779 A 12/1999 Lemieux et al.
6,019,225 A 2/2000 Kalmakis et al.
6,063,341 A 5/2000 Fassbind et al.
6,098,802 A 8/2000 Asa et al.
6,116,099 A 9/2000 Carl (Continued)

FOREIGN PATENT DOCUMENTS

EP 1216754 A1 6/2002

*Primary Examiner* — Brian R Gordon
(74) *Attorney, Agent, or Firm* — Lucas & Mercanti, LLP

(57) ABSTRACT

A method of pipetting comprises (a) providing a pipette tip holder having a plurality of segregated compartments and a tip support member for supporting a plurality of pipette tips in the pipette tip holder, the tip support member configured to support a single pipette in tip each segregated compartment; (b providing a plurality of pipette tips in the tip support member; (c) removing a first pipette tip from a first segregated compartment; (d) using the first pipette tip to complete a pipetting operation and placing the first pipette tip into a segregated compartment that has not contained a used pipette tip; (e) subsequently removing the first pipette tip from the segregated compartment and using the first pipette tip to complete another pipetting operation; and, (f) replacing the first pipette tip into the pipette tip holder, whereby the first pipette tip, when placed in the segregated compartment, is segregated in the pipette tip holder to reduce the possibility of a fluid from the first pipette tip contacting other pipette tips in the pipette tip holder.

10 Claims, 9 Drawing Sheets

U.S. PATENT DOCUMENTS

| | | | | |
|---|---|---|---|---|
| 6,164,449 | A | 12/2000 | Lahti | |
| 3,182,719 | A1 | 2/2001 | Yahiro | |
| 6,221,317 | B1 * | 4/2001 | Carl | 422/564 |
| 6,286,678 | B1 | 9/2001 | Petrek | |
| 6,328,933 | B1 | 12/2001 | Labriola et al. | |
| 6,419,086 | B1 | 7/2002 | Vecchio | |
| 6,506,610 | B1 | 1/2003 | Fassbind et al. | |
| 6,514,466 | B2 | 2/2003 | Labriola et al. | |
| 6,539,015 | B2 | 3/2003 | Voit et al. | |
| 6,790,413 | B2 | 9/2004 | Ngo et al. | |
| 6,852,283 | B2 | 2/2005 | Acosta et al. | |
| 7,189,369 | B2 * | 3/2007 | Higuchi | 422/511 |
| 7,220,590 | B2 | 5/2007 | Moritz et al. | |
| 2001/0012492 | A1 * | 8/2001 | Acosta et al. | 422/65 |
| 2004/0096360 | A1 * | 5/2004 | Toi et al. | 422/63 |
| 2005/0082243 | A1 | 4/2005 | Lahti et al. | |

* cited by examiner

METHOD OF PIPETTING USING A PIPETTE TIP HOLDER

CROSS-REFERENCE TO RELATED APPLICATION

This is a Division of application Ser. No. 11/184,978 filed Jul. 20, 2005, the entire disclosure of which is hereby incorporated by reference herein in its entirety,

FIELD OF THE INVENTION

This invention relates generally to pipette tip holders, and more particularly to pipette tip holders or boxes for use with automated pipette machines.

BACKGROUND OF THE INVENTION

Automatic pipette machines or robots are used in the chemical and biological fields to automatically pipette fluids from one place to another, without the need for direct human involvement. Such machines typically load disposable pipette tips from a tip box or tip holder onto a pipette head. Conventional tip boxes generally comprise of a tray with individual holes in which the pipette tips are suspended, and are not designed with the concept of replacing a used tip in the rack. Replacing used tips in the rack has the advantages of eliminating a separate waste container for used tips and allowing the tips to be reused whenever the particular analysis method allows for such reuse. However, by placing a used tip next to an unused tip or next to a tip used to pipette a different fluid, the chance for cross contamination between the tips arises either from direct transfer of fluid through contact between the tips or indirect transfer through splashing from drops falling from the used tips. In addition, some chemical or biological processes require significantly different volumes of fluid to be pipetted at various steps of the analysis, in which case an automated pipetting machine would require different sized pipette tips to transfer the different volumes accurately. However conventional tip boxes accommodate only one volumetric size of pipette tip at a time. If two different pipette tip sizes are needed then two different types of tip box are necessary. This takes tip valuable space on the limited working area of the pipetting machine.

It is desirable to provide a pipette tip holder that reduces that chance of cross contamination of pipette tips so as to enable the reuse of pipette tips in chemical or biological analysis processes. It is also desirable to provide such pipette tip holder that can also accommodate more than one volumetric size of pipette tip, and be relatively easy and inexpensive to fabricate.

SUMMARY OF THE INVENTION

In a first aspects the invention is directed to a pipette tip holder for use with automated pipette machines comprising a first container having a bottom and sides to define a first cavity and a top edge portion defining an opening to said first cavity, a plurality of vertical dividers within the first cavity connected to the bottom and the sides of the first container for dividing the first cavity into segregated compartments or reservoirs for limiting or preventing the flow of fluid between said compartments or reservoirs when the first container is upright, and a tip support member connected to the first container and being adapted to suspend a plurality of pipette tips within the first cavity such that at least a bottom portion of each pipette tip is within an individual reservoir, thereby segregating the pipette tips to reduce the possibility of fluid from one tip contacting another tip in the pipette tip holder. In some embodiments, the tip support member is adapted to suspend a plurality of pipette tips of more than one size within the first cavity.

In some embodiments, the tip support member comprises a lid member over the opening of the first container, the lid member defining a plurality of apertures for receiving the pipette tips, each aperture being aligned with a reservoir and being adapted to suspend a pipette tip within said reservoir. The lid member may define apertures of more than one size, each aperture being adapted to suspend a pipette tip of a certain size within a reservoir. The lid member may be removable from the first container. The lid member, in some embodiments, comprises a planar top in which the apertures are defined connected to sides to form an inverted second container defining a second cavity, and having a bottom edge portion on said sides defining an opening to the second cavity, the bottom edge portion being adapted to releasably connect to the top edge portion of the first container such that the second cavity merges with the first cavity when the lid member is connected to the first container.

The lid member in some embodiments includes a plurality of vertical dividers within the second cavity connected to the planar top and the sides of the second container for dividing the second cavity into segregated compartments that align with the reservoirs of the first container when the lid member is connected to the first container.

In some embodiments, the first container includes a first connecting portion on the top edge portion, and the lid member includes a second connecting portion on the bottom edge portion that is adapted to closely fit into the first connecting portion. The first connecting portion may further include an inward facing groove, and the second connecting portion may further include an outward facing ridge that is complimentary to the groove such that the ridge closely fits into the groove to provide a snap fit engagement between the lid member and the first container. A cap adapted for a close releasable connection over the lid member to provide a cover for pipette tips being supported by the lid member may be provided in some embodiments.

In another aspect, the invention is directed to a pipette tip holder for holding a plurality of pipette tips in an automated pipette machine. The pipette tip holder includes a container that defines a cavity, at least one vertical divider in the cavity for dividing the cavity into a plurality of segregated compartments, and a tip support member. The tip support member is connected to the container. The tip support member defines a plurality of apertures. The apertures are sized to receive and suspend said pipette tips in the cavity. Each aperture is generally aligned with one of said compartments. The at least one vertical divider is sized and positioned to inhibit contact between bottom portions of adjacent pipette tips.

In one embodiment of this aspect, the cavity in the container is a first cavity and the tip support member defines a second cavity. The tip support member is connectable with the container such that the first and second cavities communicate with each other and together form an internal cavity for receiving the pipette tips.

In a further embodiment of this aspect, the at least one vertical divider is sealingly connected to the container such that each compartment is sized to hold a volume of fluid and thereby inhibit a flow of fluid contained therein to any other of said compartments.

BRIEF DESCRIPTION OF THE DRAWINGS

For a better understanding of the present invention and to show more clearly how it may be carried into effect, reference will now be made by way of example to the accompanying drawings, in which.

DETAILED DESCRIPTION OF THE DRAWINGS

In the accompanying drawings, like numerals indicate the same elements. It will be understood that the present disclosure is an exemplification of the principles of the invention and does not limit the invention to the illustrated embodiments. Therefore, specific details disclosed herein are not to be interpreted as limiting, but rather as a basis for the claims and as a representative basis for teaching one skilled in the art to employ the present invention.

Figure 1:
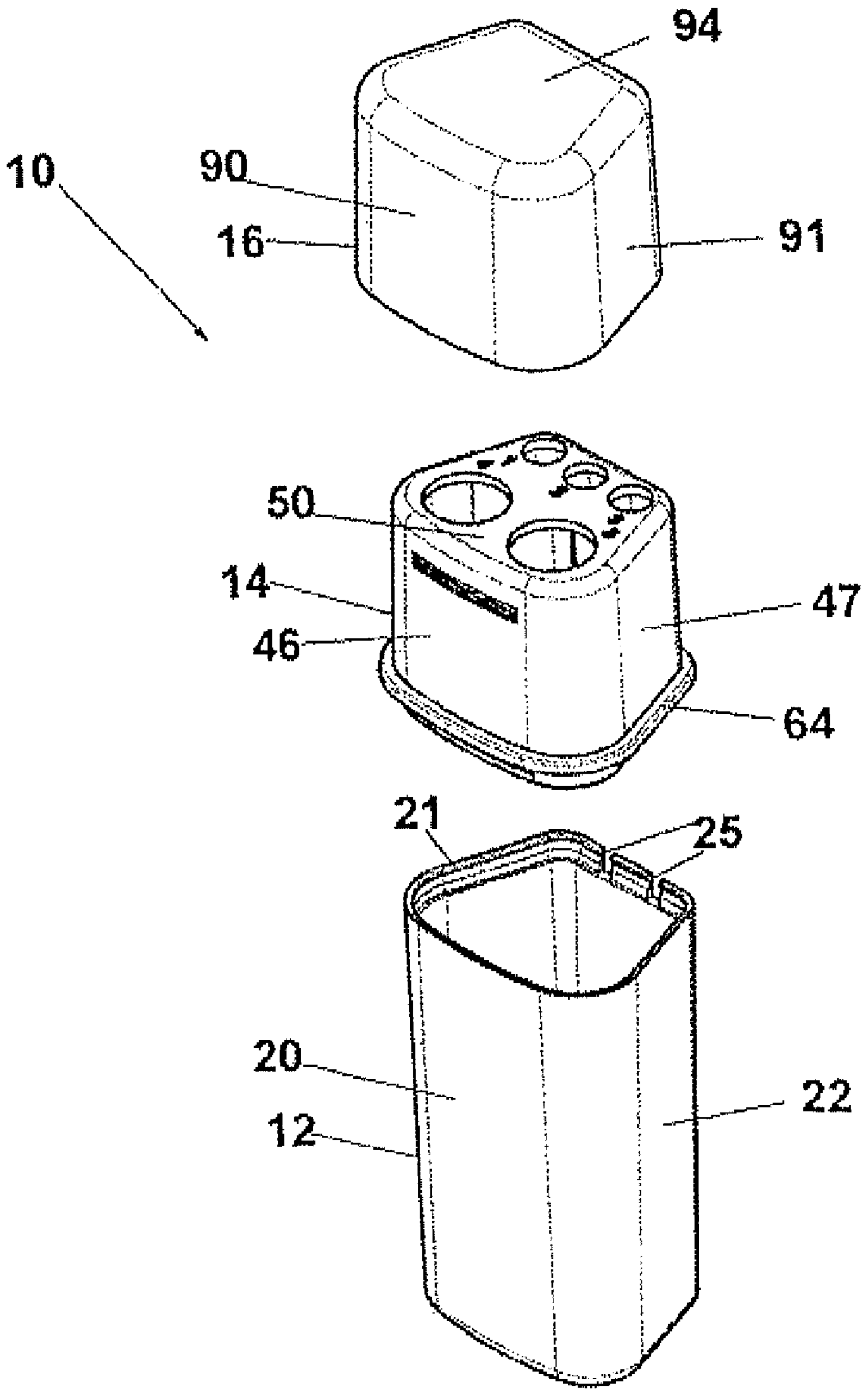
FIG. 1 is an exploded view of a pipette tip holder in accordance with an embodiment of the present invention.
Figure 2:
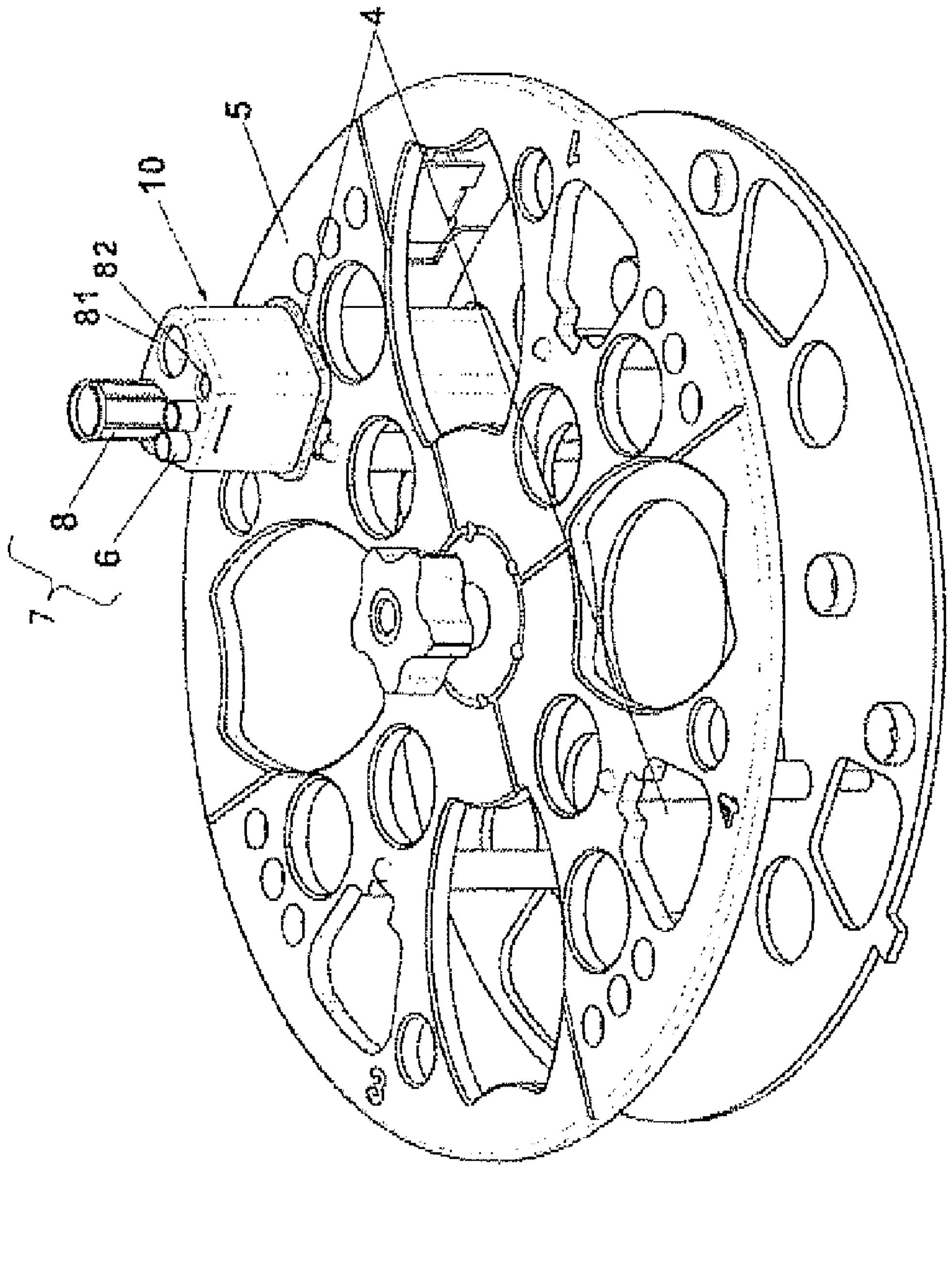
FIG. 2 is a perspective view of the pipette tip holder of FIG. 1 loaded onto a carousel of an automatic pipetting machine.

Referring to FIG. 1, there is illustrated in an exploded view a pipette tip holder or pipette tip box 10 in accordance with an embodiment of the present invention. Pipette tip box 10 comprises a container 12 and a tip support member such as lid member 14, and optionally also includes a cap 16, Container 12, lid member 14 and cap 16 may be similarly dimensioned in cross-section to that of an isosceles trapezoid with rounded corners. Lid member 14 is adapted for a snap-fit engagement with container 12, and cap 16 is designed to fit over and engage a top portion of lid member 14, as described below. In FIG. 2, pipette tip box 10 without the cap 16 is shown holding a plurality of tips 7, including a tip 6 of a first size, and two tips 8 of a second size, which is different from the first size. The tip holder 10 is positioned within a complementarily dimensioned aperture 4 of a carousel 5 of an automated pipette machine (not shown). It will be apparent to persons skilled in the art that the tip box 10 may be otherwise shaped or dimensioned for use with particular sizes of pipette tips and/or with particular automated pipette machines. While the tip holder 10 is shown holding two different sizes of tips 7, it is possible for the tip folder 10 to be configured to hold more than two different sizes of tip 7. Preferably, the container 12, lid member 14 and cap 16 are made of a suitable injection molded plastic for ease of production and low cost.

Referring to FIGS. 3-7, container 12 comprises a bottom 18 (FIG. 3) connected to sides or side walls 20, 21, 22, and 23, (FIG. 7) to define an internal cavity 24 (FIG. 5) and a top edge portion 26 that defines the opening of container 12. Of course, in alternative embodiments of the present invention, container 12 may be cylindrical, in which case the side member would comprise of a cylindrical tube, or if the container were a square, then the side member would comprise four equal side walls. Portions of the internal surfaces of side walls 20, 21/22, and 23 proximate the top edge portion 26 define a channel 28 (FIG. 6) that extends around the perimeter of container 12 thereby providing a shoulder 29. Channel 28 thereby provides a first connecting portion of container 12. The portion of side walls 20, 21, 22, and 23 located within channel 28 further defines a semicircular groove 30 that faces inward and extends around at least a part of the perimeter of container 12. On top edge 26 of side wall 23 are defined two equally spaced notches 25 which are discussed further below.

Within a lower two-thirds of container 12 is provided a central vertical divider 32 that extends between side walls 21 and 22 and joins with bottom 18, to divide the lower portion of cavity 24 (FIG. 4) into two sections which may be of unequal size. These two sections are further divided by vertical dividers 33, 34, and 35 (FIG. 7) that extend between central divider 32 and side walls 23 and 20 respectively, and join with bottom 18. The dividers 32, 33, 34 and 35 divide the lower portion of cavity 24 into separate compartments 36, 37, 38, 39 and 40. The dividers separate the bottom portions of a plurality of pipette tips 7 when the pipette tips 7 are positioned in the tip holder 10. The bottom portions of the pipette tips 7 are those portions of the pipette tips 7 that are immersed in a liquid during use of the pipette tips during use. In other words, the bottom portion of the pipette tips 7 is the portion whose exterior surface is wetted during use of the tip 7.

The dividers 32, 33, 34 and 35 may be sealingly connected to the container 12, such that the compartments are sealed along their sides and bottom thereby forming reservoirs 36, 37, 38, 39 and 40. The compartments are sized to hold a volume of fluid and thereby inhibit a flow of fluid contained therein to any other of the compartments.

As described in more detail below, the dividers segregate at least the lower portion of the pipette tips from adjacent pipette tips. By seating the dividers with the bottom and sides of the cavity 24, the reservoirs contain drips from a used pipette tip being held therein to prevent fluid from the used tip from flowing into other reservoirs and under other pipette tips within the tip holder 10.

Figure 5:
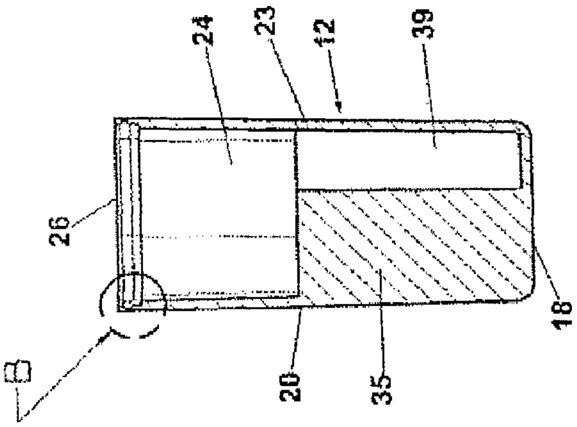
FIG. 5 is a section view of the container through line 5-5 shown in FIG. 3.
Figure 4:
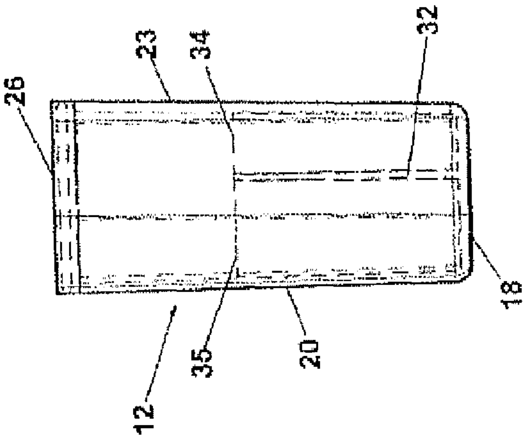
FIG. 4 is a side elevation view of the container showing the dividers within the cavity using broken lines.
Figure 3:
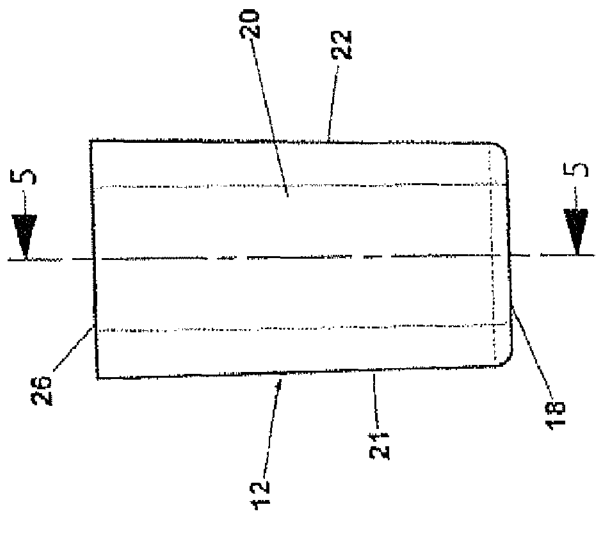
FIG. 3 is a front elevation view of the container of the pipette tip holder of FIG. 1.
Figure 6:
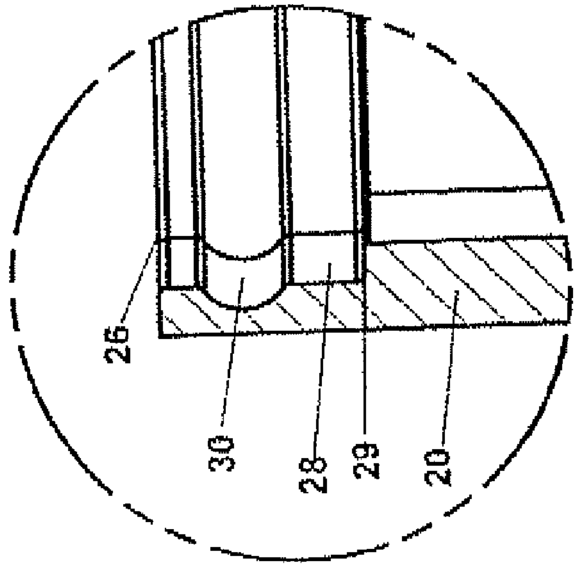
FIG. 6 is a detailed view of area B of the container as shown in FIG. 5.
Figure 7:
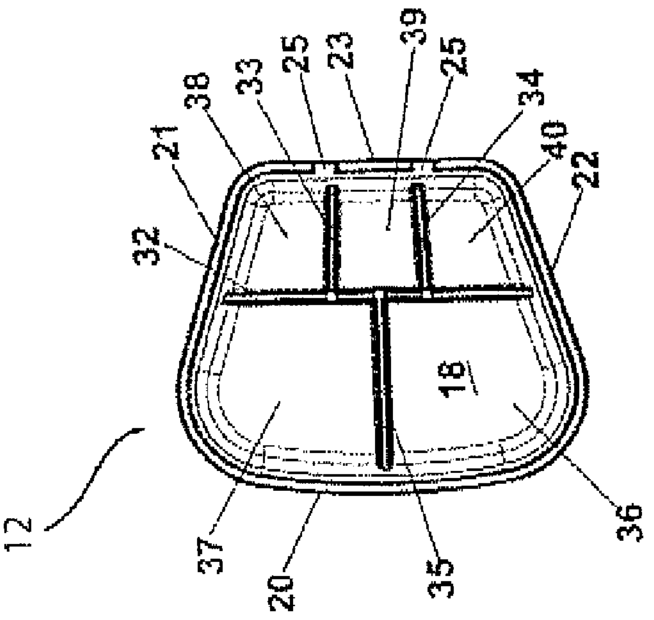
FIG. 7 is a top plan view of the container of FIG. 1.

Referring to FIGS. 8-12, lid member 14 comprises a planar top 50 connected to sides or side walls 46, 47, 48, and 49, (FIG. 12) to form an inverted second container that defines a second or lid cavity 51 and has a bottom edge portion 56 (FIG. 8) that defines an opening in the lid member 14. The external surfaces of side walls 46 and 49 (FIGS. 8 and 9) include gripping portions 54*a* and 54*b* respectively. Each gripping portion 54*a* and 54*b* comprises a plurality of closely spaced, parallel grooves. A second connecting portion 58 (FIG. 9) is provided on the external surface of the side walls 46, 47, 48, and 49 (FIG. 12) proximate the bottom edge 56 (FIG. 9) of lid member 14. Second connecting portion 58 is dimensioned to closely fit into channel 28 (FIG. 6) of container 12. Within second connecting portion 58 (FIG. 11) on at least a part of each side 46, 47, 48, and 49 (FIG. 12) is provided a semi-circular ridge 60 (FIG. 11) that faces outward and is adapted to closely fit into, and thereby engage, groove 30 (FIG. 6) of container 12 to provide a snap-fit between the lid member 14 (FIG. 10) and the container 12 (FIG. 5). A portion of lid member 14 (FIG. 8) above and adjacent to second connecting portion 58 is provided with a peripheral lip 64 that is adapted to seat against top edge 26 (FIG. 5) of container 12. On bottom edge 56 of side wall 49 (FIG. 9) are provided two equally spaced projections 66 (FIG. 12) that spatially correspond with, and are adapted to fit into, notches 25 (FIG. 7) on the container 12. The projections 66 are used to position the tip box 10 within the aperture 4 (FIG. 2) of the carousel.

Within the second cavity of lid member 14 (FIG. 12) is provided a central divider 70 that extends between side walls 47 and 48, and joins with top member 50 to divide the cavity into two. These are further divided by sub-dividers 71 and 72, 73 that extend between central divider 70 and side wall 46 and 49 respectively, and join with top member 50. Accordingly, the cavity of lid member 14 is divided into separate compartments 75, 76, 77, 78 and 79 thereby preventing contact between adjacent tips as a tip is being inserted into the tip holder by the pipette machine.

Figure 12:
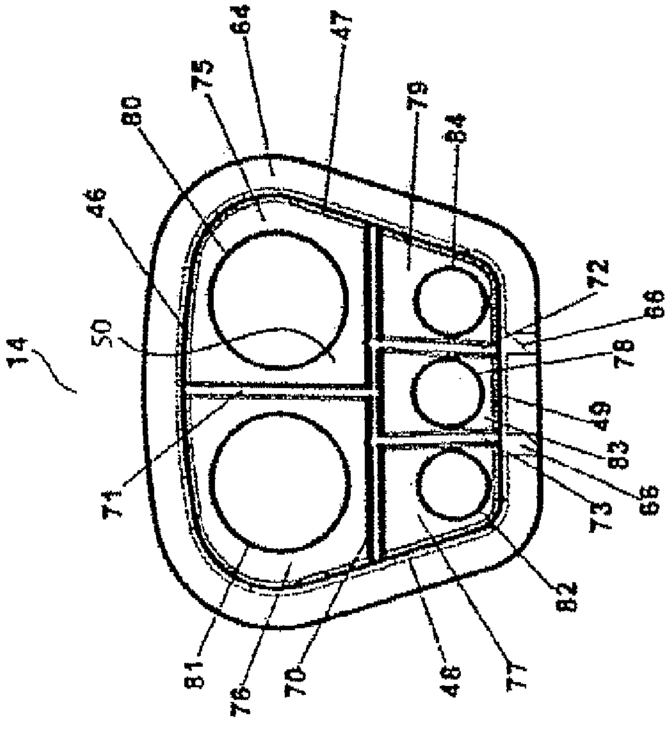
FIG. 12 is a section view of the lid member through line 12-12 of FIG. 8.

Referring to FIG. 12, top member 50 defines apertures such as holes 80, 81, 82, 83 and 84, each of which is aligned within the boundaries of a compartment. The holes are sized to accommodate a desired size or shape of pipette tip and to suspend the main portion of the tip within the tip box 10. With lid member 14 (FIG. 12) connected to container 12 (FIG. 7), the cavities 51 and 24 communicate with each other and form an internal cavity. Additionally, central divider 70 (FIG. 12) aligns with central divider 32, (FIG. 7) and dividers 71, and 72 and 73 (FIG. 12) align with dividers 35, and 34 and 33 (FIG. 7) respectively. Accordingly, compartments 75, 76, 77, 78 and 79 (FIG. 12) in lid member 14 align with reservoirs 36, 37, 38, 39 and 40 (FIG. 7) respectively in container 12. Thus, each pipette tip suspended from the top member 50 is within the boundaries of its own compartment-reservoir combination and is thereby shielded from contact with the fluid of adjacent pipette tips. In the illustrated embodiment, holes 80 and 81 and corresponding compartment-reservoir combinations 75-36 and 76-37 are sized to accommodate a larger pipette tip, such as a 5 mL tip; whereas, holes 82, 83 and 84 and corresponding compartment-reservoir combinations 77-38, 78-39 and 79-40 are sized to accommodate a smaller pipette tip, such as a 1 mL tip. Preferably, the size and the number of pipette tips that the tip holder 10 can accommodate matches the size and the number of tips required to process a given sample. For example, the illustrated embodiment is designed to hold the size and number of tips required for a specific magnetic cell separation process. However, the present invention can be applied to other automated pipetting processes.

By manufacturing the lid member 14 so that it defines a cavity, the manufacture of the container 12 is simplified, since it can be made without having unduly deep, narrow aspect-ratio reservoirs which can represent a challenge to manufacture using certain processes, such as some injection molding processes.

By providing dividers 70, 71, 72 and 73 (FIG. 12) on the lid member 14, which mate with the dividers 32, 33, 34 and 35 (FIG. 7) on the container 12, deep individual compartments that are each defined in part by dividers of the container and in part by dividers of the tip support member, whereby adjacent pipette tips 7 are separated substantially entirely from each other within the tip support member 14 and container 12.

It is alternatively possible for the lid member 14 to not include a second container (ie. the second cavity). For example, the lid member 14 could be a plate similar to top member 60 and could contain apertures 80, 81, 82, 83 and 84 for permitting the pass-through of pipettes. In this alternative, the lid member 14 could, for example, be provided with attachment tabs that connect the lid member 14 to the container 12 (FIG. 1). This alternative embodiment retains the advantage that the dividers permit the separation of at least the bottom portions of adjacent pipette tips, while using less material and/or with a reduced manufacturing difficulty than some tip holders of the prior art.

It is alternatively possible for the lid member 14 to have a second cavity, but to not include dividers therein. Providing the second cavity, even if it does not contain dividers, still provides the advantage that the container 12 can be made with compartments with a reduction in difficulties associated with molding of high aspect ratio compartments.

By making the lid member 14 removable from the container 12 (FIG. 1) cleanout of the tip holder 10 is facilitated after it has been used. It is alternatively possible, however, for the lid member 14 to be non-removably mounted to the container 12. For example, the lid member 14 could be an injection molded piece that is attached to the container 12 by an adhesive.

Figure 9:
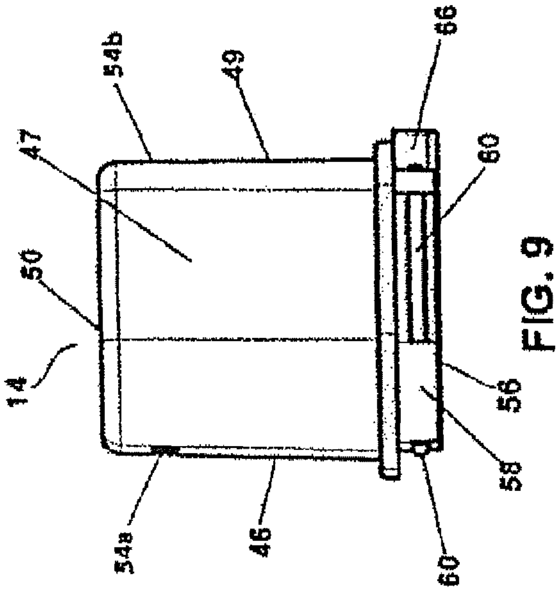
FIG. 9 is a side elevation view of the lid member of FIG. 1.
Figure 8:
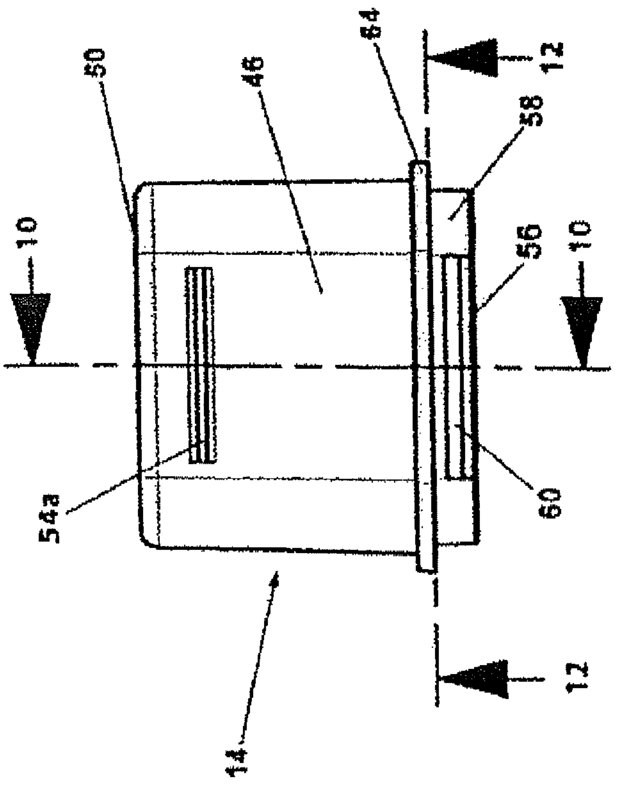
FIG. 8 is a front elevation view of the lid member of FIG. 1.
Figure 11:
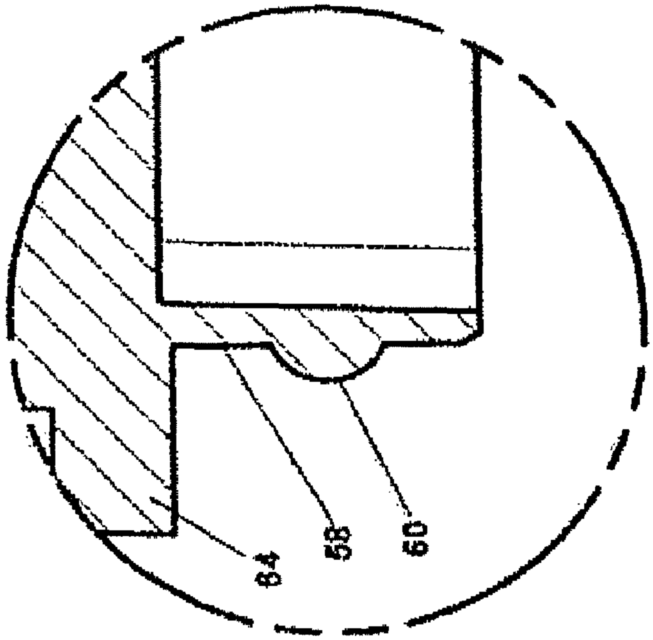
FIG. 11 is a detailed view of area D of the lid member as shown in FIG. 10.
Figure 10:
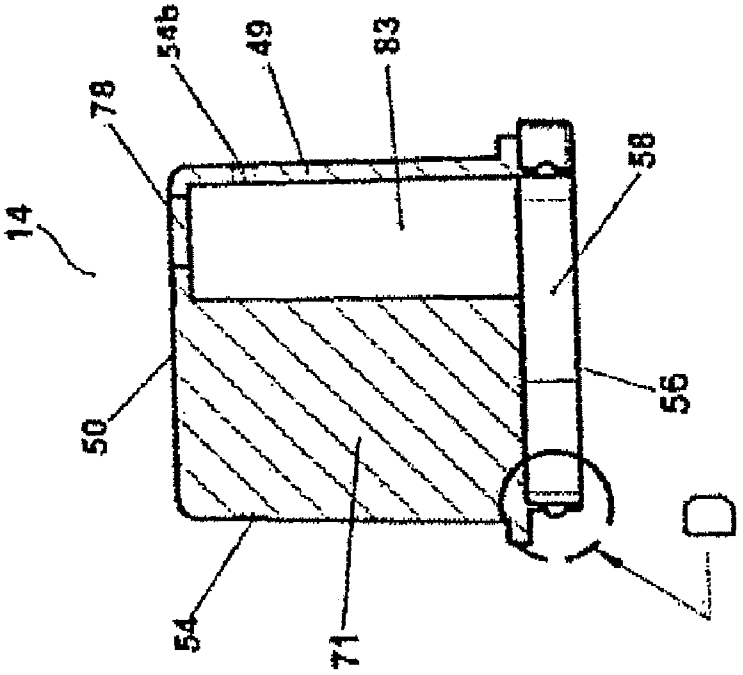
FIG. 10 is a section view of the lid member through line 10-10 shown in FIG. 8.
Figure 13:
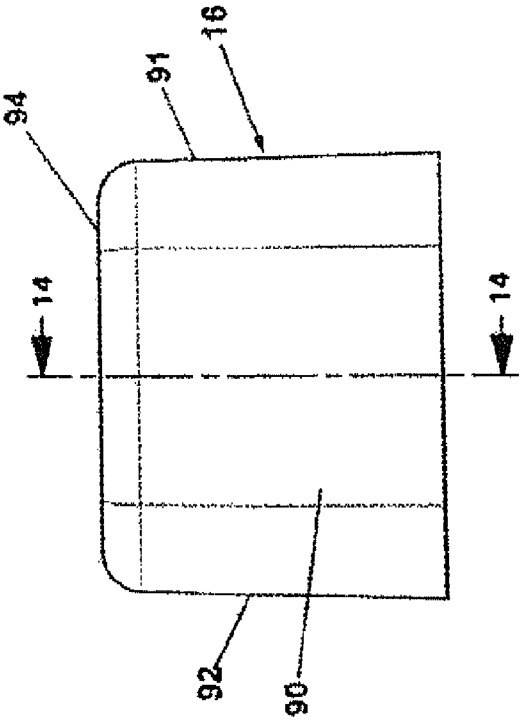
FIG. 13 is a front elevation view of the cap of FIG. 1.
Figure 15:
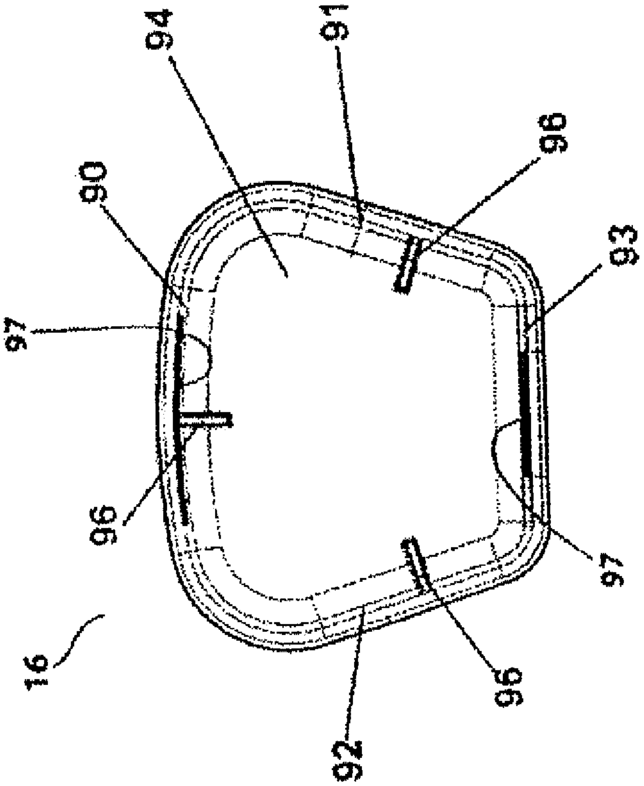
FIG. 15 is a bottom plan view of the cap of FIG. 1.
Figure 14:
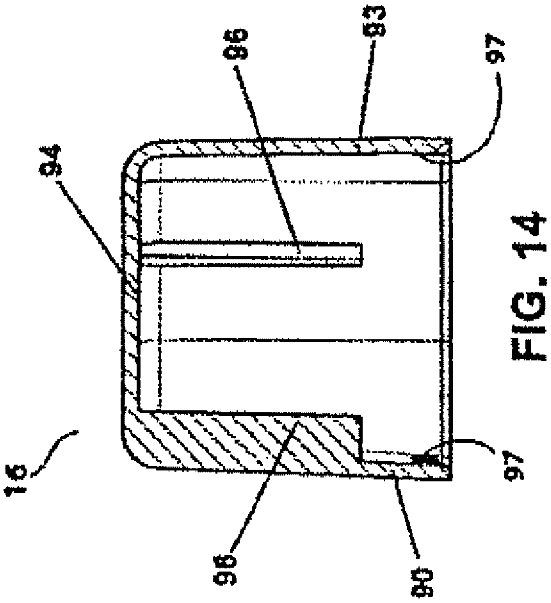
FIG. 14 is a section view of the cap through line 14-14 as shown in FIG. 13.

Referring to FIGS. 13-15, cap 16 comprises sides 90, 91, 92 and 93 connected to top 94 to define a cavity within the cap 16. Cap 16 is dimensioned to closely fit over lid member 14 (FIG. 1) so that the tops of pipettes supported in the lid member are enclosed by the cap 16. This facilitates transport of the tip holder 10 with tips therein, while maintaining sterility of the tips. Within the cavity of cap 16 on each of sides 90, 91 and 92 are provided flanges 96 (FIG. 15) that originates at top 94 and extends approximately three-fourths of the distance down sides 90, 91 and 92, each flange terminating in a straight edge. When the cap is placed over the lid member 14 (FIG. 9), the flanges 96 (FIG. 15) abut top member 50 (FIG. 9) of the support member 14 thereby providing a stop for the cap. Ridges 97 on the inside surface of sides 90 and 93 engage the complimentary grooves on the gripping portions **54*a* and 54*b* (FIG. 9) for holding the cap 16 (FIG. 14) on the lid member 14 (FIG. 9**).

FIG. 2 shows the illustrated embodiment of the pipette tip box in use in a carousel of a θ-z-θ automated pipette machine which combines rotational (θ) and vertical (z) motion of a robot arm holding the tip head with rotational (θ) motion of the carousel that holds the pipette tip boxes and the samples, thereby allowing the tip head to access the tips and the samples on the carousel. The pipette machine picks up the desired pipette tip from the box and returns it to the tip box after completing the pipetting operation. The pipette machine can then pick up a tip of a different size as desired from the tip box 10. After each operation, the tips may be returned to the tip box 10 whereby the compartmentalization of the tips reduces the chance of contamination of the tips by contact with adjacent tips or from fluid from other tips within the tip box. It will be apparent to persons skilled in the art that the tip box 10 may also be used in the more common class of robots known as x-y-z gantry style robots where the moveable tip head moves along one vertical axis and two orthogonal horizontal axes of motion.

Figure 16:
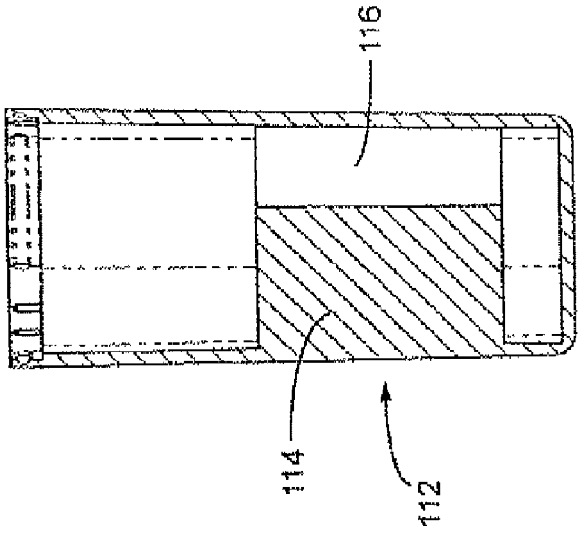
FIG. 16 is a section view of another container for use in a pipette tip holder in accordance with another embodiment of the present invention.

Referring to FIG. 16, a container in accordance with another embodiment of the present invention is generally indicated at 112. Container 112 is similar to container 12 (FIGS. 3-7), except that the vertical dividers extend from the side walls and do not join with the bottom wall of the container, as is exemplified by central vertical divider 114. Accordingly, the vertical dividers of container 112 define segregated compartments 116 within the container for reducing the possibility of contamination between adjacent pipette tips as the tips are inserted and stored within the pipette tip box 10 between uses, rather than having individual reservoirs as in container 12 (FIGS. 3-7) with dividers that seal at the bottom and sides to prevent the flow of fluid between the reservoirs.

Figure 17:
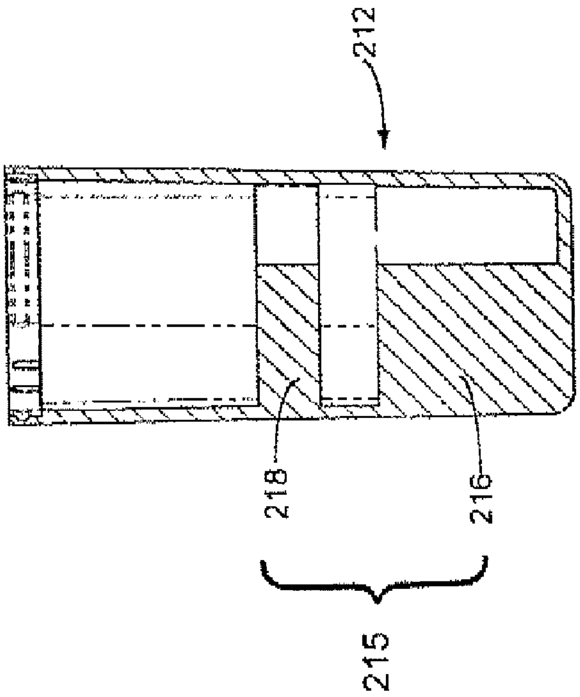
FIG. 17 is a section view of yet another container for use in a pipette tip holder in accordance with another embodiment of the present invention.

Referring to FIG. 17, a container in accordance with yet another embodiment of the present invention is shown generally at 212. Container 212 may be similar to container 12 (FIGS. 3-7) except that the vertical dividers, one of which is shown at 215, comprise a plurality of divider segments as is exemplified by segments 216 and 218. The lowest of the divider segments (eg. segment 216) may be sealed at the bottom and sides of the cavity thereby forming a reservoir that prevents fluid flow between adjacent reservoirs.

It has been shown and described for the container 12 to have four dividers in its cavity 24, dividing the cavity 24 into five compartments. It is alternatively possible for the container 12 to have fewer or more dividers thereby dividing the cavity 24 into fewer or more compartments. For example, the container could have as few as one divider, thereby dividing the container 12 into two compartments.

Other configurations of the vertical dividers are possible, such as for example, dividers that extend upwards from the bottom wall of the container but do not join with the sides (not illustrated), provided that some physical barrier exists between adjacent pipette tips to reduce the possibility of contamination as the tips are inserted and stored within the pipette tip box between uses.

While the above description constitutes the preferred embodiments, it will be appreciated that the present invention is susceptible to modification and change without departing from the fair meaning of the accompanying claims.

The invention claimed is:

1. A method of pipetting comprising the steps of:

a) providing a pipette tip holder having a plurality of segregated compartments and a tip support member for supporting a plurality of pipette tips in the pipette tip holder, the tip support member having a plurality of openings comprising at least one opening of a first size and at least one opening of a second size, each opening in the plurality of openings configured to support a single pipette tip in an associated segregated compartment;

b) providing a plurality of pipette tips in the tip support member, the providing comprising placing a first sized pipette tip in an opening of the first size and placing a second sized pipette tip in an opening of the second size, wherein the plurality of pipette tips comprise a number of pipette tips, each of which has a volume, such that the plurality of pipette tips enable a processing of a chemical or biological sample;

c) removing the first sized pipette tip from a first segregated compartment;

d) using the first sized pipette tip to complete a first pipetting operation as part of the processing of the chemical or biological sample and placing the first sized pipette tip into an opening of the first size associated with a segregated compartment that has not contained a used pipette tip;

e) removing the second sized pipette tip from a second segregated compartment;

f) using the second sized pipette tip to complete a second pipetting operation as part of the processing of the chemical or biological sample and placing the second sized pipette tip into an opening of the second size;

g) subsequently removing the first sized pipette tip from the segregated compartment and using the first sized pipette tip to complete another pipetting operation as part of the processing of the chemical or biological sample; and, h) replacing the first sized pipette tip into the pipette tip holder whereby the first sized pipette tip, when placed in the segregated compartment, is segregated in the pipette tip holder to reduce the possibility of a fluid from the first sized pipette tip contacting other pipette tips in the pipette tip holder.

2. The method of claim 1, wherein the segregated compartment that has not contained a used pipette tip is the first segregated compartment and the method further comprises replacing the first sized pipette tip into the first segregated compartment.

3. The method of claim 2 wherein step (h) comprises replacing the first sized pipette tip into the first segregated compartment of the pipette tip holder.

4. The method of claim 1 wherein step (h) comprises replacing the first sized pipette tip into the segregated compartment that has not contained a used pipette tip of the pipette tip holder.

5. The method of claim 1, further comprising providing an automatic pipette machine, wherein steps (c) through (h) are carried out by a robot on the automatic pipette machine.

6. A method of pipetting comprising the steps of:

a) providing a plurality of pipette tips in a pipette tip holder, the plurality of pipette tips comprising a first sized pipette tip and a second sized pipette tip, the pipette tip holder having a tip support member for supporting the plurality of pipette tips in the pipette tip holder, the tip support member having a plurality of openings comprising at least one opening of a first size and at least one opening of a second size, each opening in the plurality of openings configured to support a single pipette tip in an associated segregated compartment, wherein the plurality of pipette tips comprise a number of pipette tips, each of which has a volume, such that the plurality of pipette tips enable a processing of a chemical or biological sample;

b) using a robot to remove the first sized pipette tip from the pipette tip holder;

c) using the first sized pipette tip to complete a first pipetting operation as part of the processing of the chemical or biological sample;

d) placing the first sized pipette tip into an opening of the first size associated with a segregated compartment that has not contained a used pipette tip;

e) using the robot to remove the second sized pipette tip from the pipette tip holder;

f) using the second sized pipette tip to complete a second pipetting operation as part of the processing of the chemical or biological sample g) placing the second sized pipette tip into an opening of the second size; and h) subsequently removing the first sized pipette tip from the segregated compartment and using the first sized pipette tip to complete another pipetting operation as part of the processing of the chemical or biological sample.

7. The method of claim 6, wherein the pipette tip holder has a plurality of segregated compartments and each opening in the plurality of openings is associated with only one segregated compartment, step (b) comprises removing the first sized pipette tip from a first segregated compartment and step d) comprises replacing the first sized pipette tip into the first segregated compartment.

8. The method of claim 6 wherein step (b) comprises the steps of:

i) providing first pipetting operation instructions requiring a first sized pipette tip to an automatic pipette machine having the robot;

ii) selecting a first sized pipette tip based on the first pipetting operation instructions; and, iii) removing the first sized pipette tip from a first opening of the pipette tip holder using the robot.

9. The method of claim 8, wherein step e) comprises the steps of:

i) providing second pipetting operation instructions requiring a second sized pipette tip to the automatic pipetting machine;

ii) selecting a second sized pipette based on the second pipetting operation instructions;

iii) removing the second sized pipette tip from a second opening of the pipette tip holder using the robot.

10. The method of claim 7, wherein step e) comprises removing the second sized pipette tip from a second segregated compartment and step g) comprises replacing the second sized pipette tip into the second segregated compartment.

* * * * *